United States Patent [19]

Reiter et al.

[11] Patent Number: 4,936,040
[45] Date of Patent: Jun. 26, 1990

[54] LURE CONTAINER

[76] Inventors: Ronald J. Reiter, 19809 N. 70th Ave., Glendale, Ariz. 85308; Douglas E. Reiter, 103 Frog Island Rd., Lakeside, Ariz. 85929

[21] Appl. No.: 384,000
[22] Filed: Jul. 24, 1989
[51] Int. Cl.$^5$ ............................................. A01K 97/06
[52] U.S. Cl. ............................................. 43/25.2
[58] Field of Search ................................. 43/25, 25.2

[56] References Cited

U.S. PATENT DOCUMENTS

| | | | |
|---|---|---|---|
| 4,015,361 | 4/1977 | O'Reilly et al. | 43/25.2 |
| 4,216,604 | 8/1980 | Starke | 43/25.2 |
| 4,418,490 | 12/1983 | Ancona | 43/25.2 |
| 4,452,003 | 6/1984 | Deutsch et al. | 43/25.2 |
| 4,501,222 | 2/1985 | Stone | 43/25 |
| 4,771,564 | 9/1988 | Whitley | 43/25 |

Primary Examiner—M. Jordan
Attorney, Agent, or Firm—Cahill, Sutton & Thomas

[57] ABSTRACT

A container for holding and protecting a fishing lure attached to the line of a fishing rod comprises a unitary envelope of rubber-like material. The envelope has an elongated rectangular body with pyramidal end regions. A normally closed slit in one face of the envelope extends from the apex of one end region to the apex of the other end region. When the ends of the container are squeezed toward each other, the slit opens providing a generally rectangular opening for the length of the container. An opening in the apex of one end region allows the line to pass out of the container. A hook on the container enables it to be attached to one of the line guide rings on the rod.

5 Claims, 1 Drawing Sheet

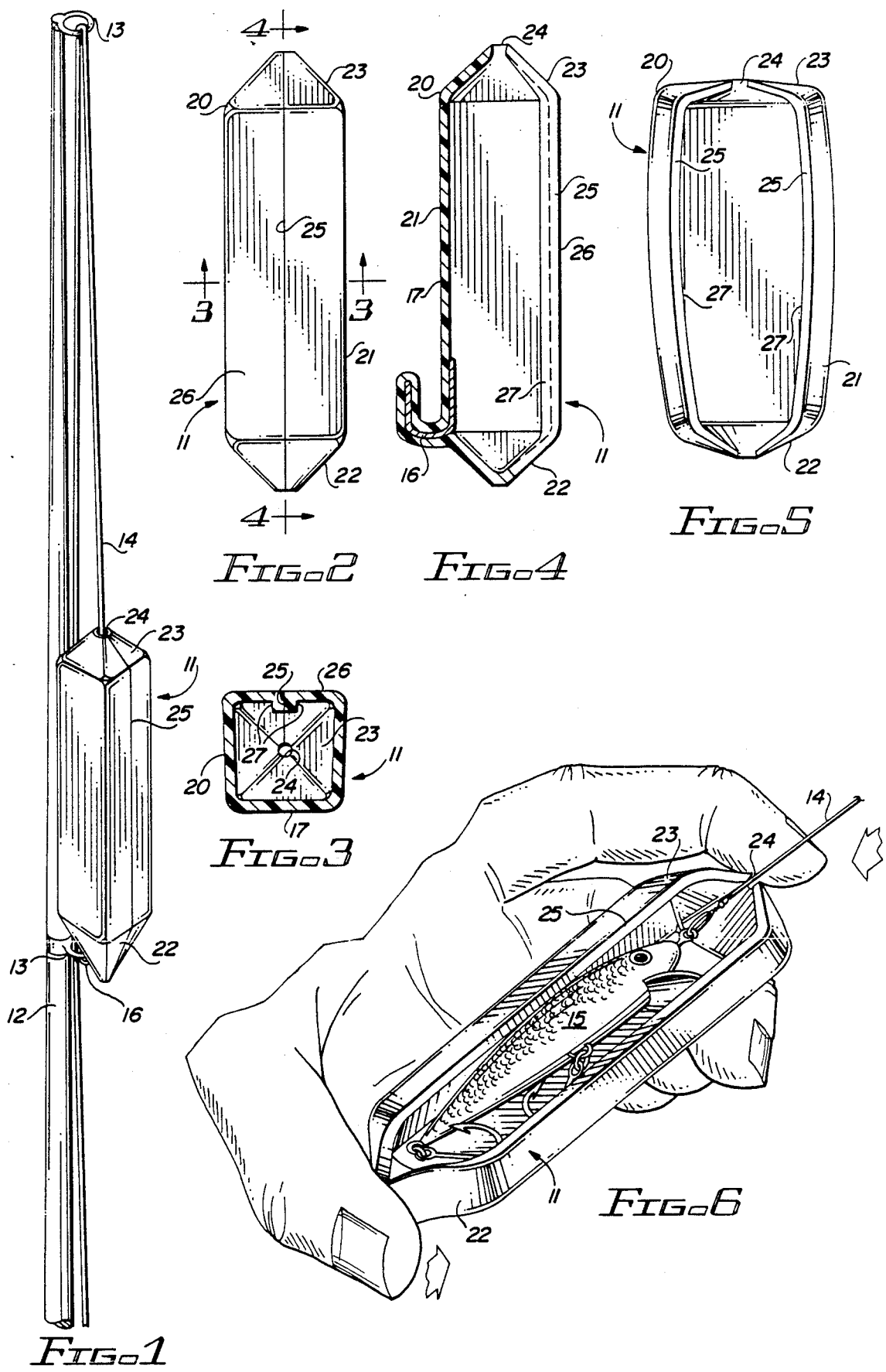

LURE CONTAINER

TECHNICAL FIELD

This invention is concerned with protecting and shielding a fishing lure having hooks thereon while the lure is attached to the line on a fishing rod and the lure is not in use.

BACKGROUND ART

It is common practice for a fisherman to store or carry around prior to use his fishing rod with a lure, or plug, attached to the fishing line which is drawn taut to hold a hook portion of the lure in one of the line guide rings of the rod. With the lure thus exposed it is subject to being damaged if it contacts a foreign object. And its hooks can provide considerable discomfort to any part of the fisherman coming in contact therewith.

It is therefore desirable to provide some quick-opening and closing container for receiving and encasing the lure when it is stored on the rod.

U.S. Pat. No. 3,395,788, granted Aug. 6, 1968 to T. F. Gill for "LURE CONTAINER WITH SELF-CONTAINED TENSION RETAINED CLOSURE" discloses a reusable container which is suitable for storing a lure after it is completely detached from the rod and line.

U.S. Pat. No. 2,667,906, granted Feb. 2, 1954 to B. Stiller for "SELF-CLOSING CONTAINER" discloses the well known rubber-like coin purse which has a slit that can be opened by pressing on opposite sides of the container. Stiller offers no suggestion that his container could be used to house a fishing lure and, indeed, the configuration of his purse does not provide an access opening which would readily admit an elongated lure with hooks thereon.

DISCLOSURE OF THE INVENTION

This invention provides a quick opening and closing container comprised of a unitary envelope of rubber-like material. The envelope has an elongated body portion with a generally rectangular cross-section providing a storage space large enough to house the lure. The envelope further comprises unitary pyramidal end portions at opposite ends of the body portion and a slit extending from the apex of one pyramidal end portion, along the central region of one face of the body portion, to the apex of the opposite pyramidal end portion. Opening the container is performed by the simple step of squeezing the pyramidal ends of the container toward each other which causes the slit to open substantially in equal amount along the length of the container. The opening provided is substantially the width of the container itself providing ready access to the interior of the container.

The container of this invention also preferably has a through opening in the apex of one of the pyramidal end regions of the envelope to permit a line attached to a lure in the container to pass out of the container.

The container also preferably carries a hook member near the end opposite the through opening and on a face of the envelope opposite the slit so that the container can be detachably connected to one of the line guide rings of a rod.

BRIEF DESCRIPTION OF THE DRAWINGS

The invention is described in greater detail hereinafter by reference to the accompanying drawings wherein:

FIG. 1 is a fragmentary perspective view of a fishing rod having the lure container of this invention associated therewith;

FIG. 2 is an enlarged plan view of the container;

FIG. 3 is a transverse sectional view through the container taken as indicated by line 3—3 in FIG. 2;

FIG. 4 is a longitudinal sectional view through the container taken generally as indicated by line 4—4 in FIG. 2;

FIG. 5 is a plan view of the container in its open condition; and

FIG. 6 is a perspective view illustrating the manner in which the container is opened.

BEST MODE FOR CARRYING OUT THE INVENTION

Referring to FIG. 1, the lure container of this invention is indicated generally by reference numeral 11. Container 11 in use is associated with a fishing rod 12 having a number of line guide rings 13 through which a fishing line 14 passes. The container 11 is adapted to house, protect and shield a fishing lure 15 (shown only in FIG. 6).

With lure 15 inside container 11, the container can be attached by means of a hook 16 affixed to its back face 17 to one of the line guide rings 13 on rod 12. When tension is applied to line 14 by a reel (not shown) the container 11 with lure 15 inside can be placed in tension and stabilized on the rod 15.

Container 11 is configured and constructed of a material which permits it to be quickly and easily opened and closed for removal and insertion of a lure 15. The configuration preferred is best shown in FIGS. 2 through 5.

Container 11 comprises a unitary envelope 20 of flexible resilient rubber-like material. Envelope 20 has an elongated body portion 21 having a generally rectangular cross-section (see FIGS. 2 and 3). Integral with the body portion of envelope 21 are end regions 22 and 23 which are pyramidal in configuration. The apex of one end region 23 of the envelope has a through opening 24 therein to permit passage of line 14 to lure 15 in the container 11.

Access to the interior of the container envelope 20 is provided by a slit 25 extending longitudinally along a middle region of the front face 26 of the container from the apex of one end region 22 to the apex of the other end region 23.

Because of the rectangular configuration of the body region 21 of envelope 20 and the configuration of the pyramidal end regions 22 and 23 together with the positioning and extent of slit 25 when pressure is applied to the apexes of end regions 22 and 23 to squeeze these ends of the container toward each other, the slit 25 opens up to a substantially equal width along the entire extent of the body region 21 of the envelope (see FIG. 5). The opening thus created is sufficiently large and unobstructed as to easily permit placement and removal of the lure 15 into and out of container 11. And because the container 11 can be opened with but one hand, the other hand is available for handling the lure 15. The achievement of a uniform opening in the envelope 20 is facilitated by providing small stiffening flanges 27 on the inner surface of front face 26 of the envelope along and in the vicinity of slit 25 (see FIGS. 3 and 4).

The unitary envelope 20 of container 11 is preferably formed by dipping a mandrel (not shown) in a bath of a curable latex, vinyl, polyethylene, or other rubber-like material. The walls of the envelope have a thickness of from 0.06 to 0.10 inch. When the material has cured, the envelope 20 is slit at 25 by a sharp instrument, such as a knife. The envelope is then peeled from the mandrel. The dip molding process described in the aforementioned Stiller patent is suitable for molding the container of this invention.

A rod or wire support at the end of the mandrel conveniently forms the through opening 24 in end region 23 of the envelope 20. The hook 16 for container 11 can be dip molded in place as the envelope 20 is formed or it can be separately attached to the envelope 20 of the container.

What is claimed is:

1. A self-closing container comprising a unitary envelope of flexible, elastic material having the properties similar to those of soft rubber, said envelope having an elongated central body having a generally rectangular crosssection and pyramidal shaped end regions at the ends of the central body, and said envelope having a normally closed slit in one face extending from the apex of one pyramidal end region to the apex of the other pyramidal end region, said container being openable with one hand by applying opposing forces to apexes of the pyramidal end regions of the envelope.

2. The container of claim 1 further characterized by having a hook member affixed to the face of the envelope opposite said slit.

3. The container of claim 1 further characterized by having a through opening in the apex of one of the pyramidal end regions.

4. The container of claim 3 further characterized by having a hook member affixed to the outer face of the envelope opposite said slit near the pyramidal end region opposite said through opening.

5. A fishing lure storage arrangement comprising a fishing rod having line guide rings thereon, a self-closing container comprising a unitary envelope of flexible, elastic material having properties similar to those of soft rubber, said envelope defining a storage space therein, said envelope having an elongated central body having a generally rectangular crosssection and pyramidal shaped end regions at the ends of the central body, said envelope having a normally closed slit in one face extending from the apex of one pyramidal end region to the apex of the other pyramidal end region, said container being openable with one hand by applying opposing forces to apexes of the pyramidal end regions of the envelope, a through opening in the apex of one end region, a hook member affixed to the face of the envelope opposite said slit, a lure disposed within the storage space in said envelope, and a line secured to said lure and passing through said through opening to a line guide ring on said pole, the hook member on said container engaging one of said line guide rings to hold the container and the lure therein adjacent said rod.

* * * * *